(12) United States Patent
Sher et al.

(10) Patent No.: US 6,801,355 B1
(45) Date of Patent: Oct. 5, 2004

(54) OPTICAL SIGNAL CONVERTER WITH FILTERED OUTPUT

(75) Inventors: Mark H. Sher, San Francisco, CA (US); Robert G. Batchko, San Francisco, CA (US)

(73) Assignee: Lightbit Corporation, Inc., Mountain View, CA (US)

( * ) Notice: Subject to any disclaimer, the term of this patent is extended or adjusted under 35 U.S.C. 154(b) by 157 days.

(21) Appl. No.: 09/991,272

(22) Filed: Nov. 16, 2001

Related U.S. Application Data

(60) Provisional application No. 60/249,496, filed on Nov. 16, 2000.

(51) Int. Cl.[7] ................................................ G02F 2/02
(52) U.S. Cl. ...................................... 359/326; 359/332
(58) Field of Search ................................ 359/326–332

(56) References Cited

U.S. PATENT DOCUMENTS

| | | | | |
|---|---|---|---|---|
| 4,109,204 A | * | 8/1978 | Kincaid et al. | ............. 375/285 |
| 4,697,926 A | * | 10/1987 | Youngquist et al. | ........ 356/478 |
| 4,770,535 A | * | 9/1988 | Kim et al. | ................... 356/478 |
| 4,872,738 A | * | 10/1989 | Risk et al. | ................... 359/285 |
| 5,796,902 A | * | 8/1998 | Bhat et al. | .................. 385/122 |
| 6,141,138 A | * | 10/2000 | Machida et al. | ............ 359/279 |

* cited by examiner

*Primary Examiner*—John D. Lee
(74) *Attorney, Agent, or Firm*—Ritter, Lang & Kaplan LLP

(57) ABSTRACT

A WDM signal converter is provided. The signal converter is formed from a DFG and a separator, such as a WDM interleaver multiplexer/demultiplexer. The DFG receives first WDM channel signal(s) and converts into second WDM channel signal(s). The pump signal which energizes the conversion is set such that one-half of its frequency is set between, and more precisely, one-half, two WDM channels. This ensures that the second WDM signal is separated by an odd number of channels from the first WDM signal. The separator which receives the output from the DFG device, can then transmit the converted second WDM signal to one separator output port and transmit any first WDM signals, such as signals which have not been converted, to a second separator output port. In effect, the separator filters the output of the DFG.

45 Claims, 5 Drawing Sheets

OPTICAL SIGNAL CONVERTER WITH FILTERED OUTPUT

CROSS-REFERENCES TO RELATED APPLICATIONS

This application claims priority from U.S. Provisional Patent Application Serial No. 60/249,496, filed Nov. 16, 2000, entitled "OPTICAL FILTER," the disclosure of which is hereby incorporated by reference in its entirety.

BACKGROUND OF THE INVENTION

The present invention relates generally to components and devices in fiberoptic communication networks, and more particularly, to optical signal generators with filtered outputs which are very useful in such networks.

Most fiberoptic networks today use wavelength, or frequency, to define a communication channel in the network. These channels for such WDM (Wavelength Division Multiplexing), or more currently, DWDM (Dense Wavelength Division Multiplexing) fiberoptic networks are defined by the ITU (International Telecommunications Union) in the 1550 nm wavelength range for transmitting and receiving information over optical fibers. Depending upon the particular network, these channels are separated by differing amounts. For example, WDM networks have a 200 GHz frequency separation and the more modem DWDM networks have a narrower 100 GHz separation. In passing, it should be noted that the terms, WDM and DWDM, are meant to be used interchangeably unless clearly differentiated as in the previous sentence.

Given these defined grids of communication channels, wavelength (or frequency) conversion is a very useful operation in such networks. Signals of one wavelength (or frequency) channel can be converted to signals of another wavelength channel. One device which is emerging as a frequency converter is the difference frequency generator (DFG). The signals of the frequency to be converted are sent as input to the DFG, which also receives an energizing pump signal. The DFG converts the input signal to an output signal at a frequency dependent upon the frequencies of the input signal and pump signal. However, at the output of the device or DFG process there may be signals at both input and output frequencies due to incomplete conversion or other phenomena. It is desirable to be able to separate the input and output frequencies (or wavelengths) from each other.

The present invention provides for wavelength conversion and separation of outputs without a typical filter device which must be tuned or adjusted depending on the value of the wavelengths involved or which must be made specifically for, and hence only work properly for, a predetermined wavelength(s). This avoids complexity, provides for increased reliability and lowers costs of manufacture and maintenance.

SUMMARY OF THE INVENTION

The present invention provides for an optical signal converter which converts signals at one frequency to signals at another frequency within a frequency grid in which each adjacent pair of frequencies in the frequency grid are separated by a predetermined amount. The optical signal converter has a difference frequency generator and a separator. The difference frequency generator receives an energizing pump signal and an input signal at a first frequency and generates a converted signal at a second frequency from the input signal and the pump signal. The pump signal is set at a frequency such that the first and second frequencies are separated by an odd multiple of the predetermined amount. The separator has an input port and at least one output port with the input port connected to the difference frequency signal generator. The separator is responsive to the odd multiple separation and transmits the converted signal to the output port so that the converted signal is separated from said input signal. The optical signal converter can receive more than one input signal to generate a plurality of corresponding converted output signals. Similarly, more than one pump signal (at different frequencies but with the relationship above) can generate a plurality of converted output signals.

More specifically, if the pump frequency is such that one-half of the pump frequency is one-half between two frequencies of the frequency grid, a WDM interleaver multiplexer/demultiplexer may be used for the separator.

DESCRIPTION OF THE SPECIFIC EMBODIMENTS

Figure 1:
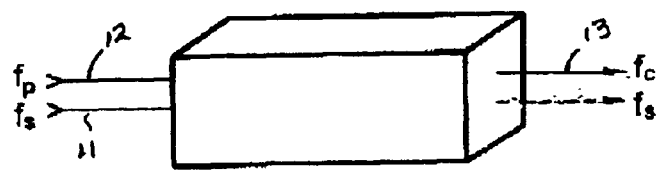
FIG. 1 is a representation of a DFG with input signal, pump signal and output converted signal.
Figure 2:
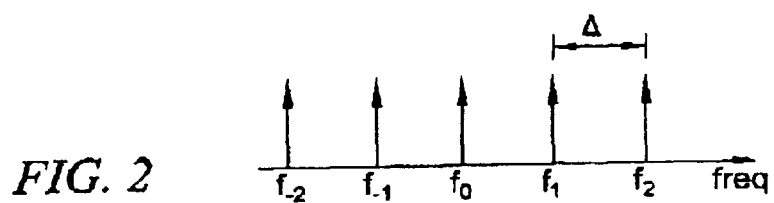
FIG. 2 illustrates a portion of an exemplary WDM frequency grid.

A representation of a DFG (Difference Frequency Generator) is illustrated in FIG. 1. The DFG 10 can receive an input signal 11 and an energizing pump signal 12 to generate a converted signal 13 corresponding to the input signal. The details of DFGs are beyond the scope of this application, but there are references with such details. For example, see Chou, Ming-Hsieu, "Optical Frequency Mixers Using Three-Wave Mixing For Optical Fiber Communications," Ph.D. thesis, Stanford University, August 1999, which describes a periodically polled lithium niobate waveguide.

The frequency (or wavelength) of the output converted signal 13 is related to the frequencies of the input signal 11 and pump signal 12. The energizing pumping signal is at frequency $f_p$ and the input signal at a lower frequency $f_s$. The output signal has a frequency $f_c$ and corresponds to the input signal and has a certain frequency (and energy) relationship to the pump signal frequency $f_p$ and input signal frequency $f_s$ given by:

$$f_c = f_p - f_s$$

The frequencies $f_s$ and $f_c$ should be within the WDM channels.

However, besides the converted signal at frequency at $f_c$, the DFG may also have additional output signals at other frequencies. Especially of concern are unconverted input signals as shown by the dotted arrow in FIG. 1. In accordance with the present invention, the output from the DFG is separated at a plurality of output ports according to whether they are input or output signals. The signals of the input and output signals are not sent to the same output port and, in a sense, a static and passive "filtering" operation which is simple and flexible is provided.

This is possible because the DFG is operated in a way that insures that the input and output wavelengths differ in a way that a separation device can recognize. The DFG is operated in a particular way that always converts an input signal of "even" frequency to a converted signal of an "odd" frequency and vice versa. This creates an advantageous combination of simplicity and flexibility.

A detailed explanation of the present invention can perhaps be best understood in the context of a WDM frequency grid. In WDM fiberoptic networks, the communication channel frequencies are defined as combs of evenly spaced frequencies about a center frequency corresponding to a wavelength approximately equal to 1545 nm. The frequency spacing $\Delta$ can be 200 GHz, 100 GHz, 50 GHz, etc.

In terms of the given frequency spacing $\Delta$ and the resulting WDM comb of frequencies, the input signal frequency to the DFG can be written as $$f_s = f_o + n_s \Delta \text{ where } n_s \text{ is an integer}$$

about an arbitrary reference frequency $f_o$ in the WDM comb or grid of frequencies. This, of course, places $f_s$ in the WDM comb of frequencies also. Likewise, to keep the converted signal within the WDM comb, the frequency of the converted signal $f_c$ is written as:

$$f_c = f_o + n_c \Delta \text{ where } n_c \text{ is also an integer}$$

With reference frequency $f_o$ in the WDM comb of frequencies, the frequency $f_p$ of the pump signal can be arbitrarily defined with respect to $f_o$ as:

$$f_p = 2f_o + n_p \Delta \text{ where } n_p \text{ is an integer}$$

or rewritten as:

$$f_p/2 = f_o + (n_p/2) \cdot \Delta$$

As stated above, the DFG has the following relationship between the frequencies of the input signal, the output converted signal, and the pump frequency:

$$f_c = f_p - f_s$$

By substitution, this leads to:

$$f_o + n_c \Delta = (2f_o + n_p \Delta) - (f_o + n_s \Delta) \text{ or}$$

$$n_c = n_p - n_s$$

Thus there is a relationship between the various integers based upon the evenness or oddness of the numbers, where evenness or oddness is defined by the common mathematical convention that integers evenly divisible by 2 (including zero) are termed "even", and integers not evenly divisible by 2 are termed "odd". For the possible combinations of $n_s$ and $n_p$, $n_c$ must be an even or odd as shown by the following Table 1:

TABLE 1

| | Evenness/Oddness of $n_c$ | |
|---|---|---|
| $n_c$ | $n_s$ even | $n_s$ odd |
| $n_p$ even | even | odd |
| $n_p$ odd | odd | even |

We can see that assuming $n_p$ is odd, $n_c$ is odd if $n_s$ is even, and if $n_s$ is odd then $n_c$ is even. If $n_p$ is odd, one-half of the pump frequency $f_p$, or $f_p/2$, does not lie on the frequency grid, but rather between the grid. Stated differently, with $n_p$ odd, the input signal frequency and output converted signal frequency are separated by an odd integer multiple of the grid spacing $\Delta$.

This relationship is useful because there are a number of devices that have periodic properties (in frequency) of transmission, reflection, or output port designation. For example, JDS Uniphase of Ottawa, Ontario, Canada and San Jose, Calif. provides WDM interleavers which provide outputs to two or four output ports for output signals separated by 200 GHz, 100 GHz and 50 GHz. These WDM devices accept WDM signals at an input port and separate them at the output ports so that no two signals with neighboring grid frequencies are passed through the same port. Many of these devices are interferometric in fundamental nature, and internally are Mach-Zehnder interferometers, Fabry-Perot interferometers, arrayed waveguide gratings, devices based on crystal-based Fourier filter technology, etc. These commercial products are called interleavers, as noted above, or multiplexers (demultiplexers when used in reverse) for their applications in a fiberoptic network and are typically made specifically to separate the frequencies of the 1550 nm telecom bands.

Figure 3:
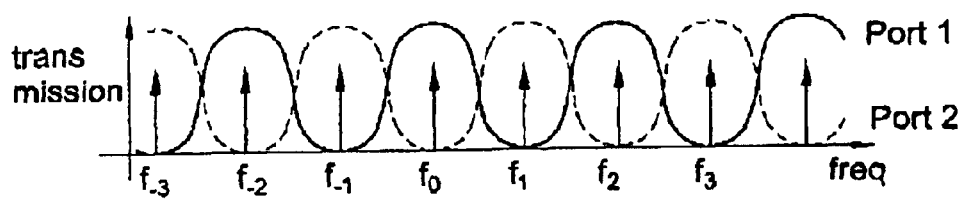
FIG. 3 illustrates the transmission characteristics of a frequency separation device.
Figure 4:
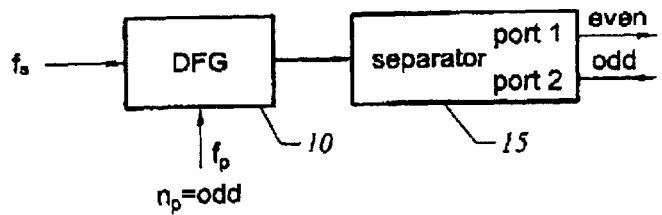
FIG. 4 is a block diagram of a difference frequency generator and a frequency separation device, according to one embodiment of the present invention.

These frequency separation devices, be it by transmission, reflection, or output port, receive either even or odd frequencies through a single input port, and transmit them out on one output port if even, and a second output port if odd. The device has transmission properties as illustrated by FIG. 3. As can be seen, the transmission properties are periodic to two different ports with a period of $2\Delta$. The device can be termed an even/odd separator and is combined with a DFG device, according to one embodiment of the present invention as shown in FIG. 4. A separator 15 is connected to the output of a DFG 10. The separator 15, as explained above, has two output ports. If $n_p$ is odd, the signals at frequencies $f_c$ and $f_s$ come out on different ports, as in the table below:

TABLE 2

Output Signals on Ports 1 and 2 Depending Upon fs Even or Odd

|  | $f_s$ even | $f_s$ odd |
|---|---|---|
| port 1 | $f_s$ | $f_c$ |
| port 2 | $f_c$ | $f_s$ |

For $f_s$ is even, $f_s$ exits on port 1 and $f_c$ on port 2. For $f_s$ is odd, $f_s$ exits on port 2 and $f_c$ on port 1. In either case, the input signal at $f_s$ is separated from the converted signal at $f_c$.

Figure 5A:
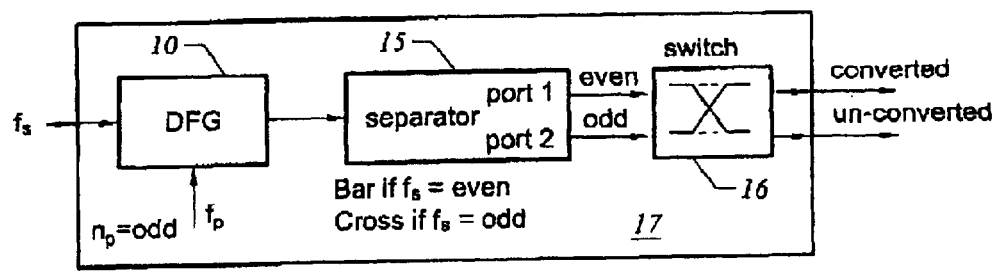
FIG. 5A is a block diagram of the FIG. 4 combination with a switch according to the present invention.
Figure 5B:
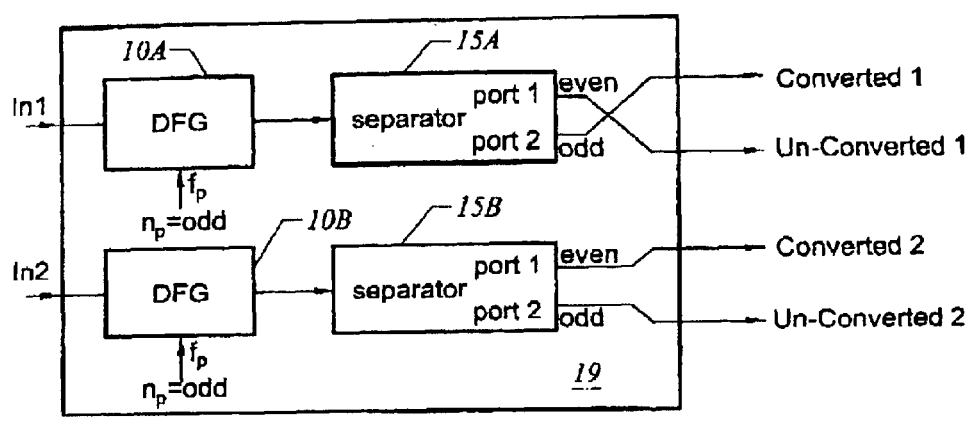
FIG. 5B is a block diagram of a pair of FIG. 4 combinations with different connections to the device output ports

Control over which output contains the converted output $f_c$ can be done with different techniques. FIG. 4 shows an optical switch 16 which is connected to the output ports of the separator 15. Responsive to a control signal, the switch 16 selects whether port 1 or port 2 of the separator 11 goes to the converted signal output port of the complete system 17. The switch selection depends on whether $f_s$ is even or odd, as shown in FIG. 5A. Alternatively, a pair of devices as shown in FIG. 5B can be constructed in one system 19. One device with its elements denoted with the suffix A has port 2 as the converted output port and a second device its elements denoted with the suffix B has port 1 as the converted output. Choice of which device to use depends on whether the input signal frequency $f_s$ is even or odd, as shown in FIG. 5B.

It is possible that the pump light for the DFG process, at $f_p=2f_o+n_o\Delta$, may be generated within the same device by second harmonic generation (SHG) of an original pump signal at frequency $f_p/2=2f_o+n_p/2*\Delta$. That is, while the actual pump signal is at $f_p/2$, the energizing pump frequency for the DFG process is still $f_p$. Also note that in the case of pump generation by SHG in the same device as the DFG, there may be an issue of separating the signals at $f_p/2$ from the converted output as well. If the transmission curves in FIG. 3 of the separator can be made to fall off more sharply from their peaks, it may be possible to use the same arrangement as well.

Likewise, as in the case of SHG:DFG process described immediately above, the present invention is still effective even with four-wave mixing (FWM). Again, while the pump signal is at $f_p/2$, the two pump signal photons in the FWM process supply energy equivalent to one photon at frequency $f_p$. The same relationship described above between frequencies of the converted signal, the input signal and the energizing "pump" signal is still applicable, i.e.:

$$f_c=f_p-f_s$$

In other words, the frequency $f_p/2$ of the actual pump signal can be set between the frequency grid so that $n_p$ (for the frequency $f_p$) is odd and the input signal frequency and output converted signal frequency are separated by an odd integer multiple of the grid spacing $\Delta$. Hence it should be understood, that term, DFG, difference frequency generator (or generation), is used inclusively for DFG alone, SHG:DFG and FWM processes. By ensuring that the frequency $f_p$ is as described above, the "DFG" converts the input signal of one frequency type to an output signal of the other frequency type.

It should be also noted that if the DFG (which includes devices with SHG:DFG processes) is implemented as a periodically polled lithium niobate waveguide as described above, the operation of such devices is sensitive to the polarization of the optical signals. This is undesirable and techniques to ensure the insensitivity of the DFG to polarization are described in the literature. For example, see Chou, Ming-Hsieu et al., "Optical Signal Processing and Switching in Second-Order Nonlinearities in Waveguides," *IEICE Trans. Electron.*, Vol. E83-C, No. 6, June 2000, pp. 869–874. Such techniques can be incorporated into the DFG devices described, in accordance with the present invention.

As described above, the optical signal converter converts an input signal of even (odd) frequency and converts it to a signal of odd (even) frequency. The converter separates the signals of even and odd frequencies so that the input signals are not mixed with the converted signals. Further embodiments of the present invention allows all the converted signals to be sent out through one fixed output port whether the input signals have even and odd frequencies (simultaneous conversion of multiple input signals), or whether the input signal changes between even and odd frequencies (sequential conversion of different input signals).

Figure 6A:
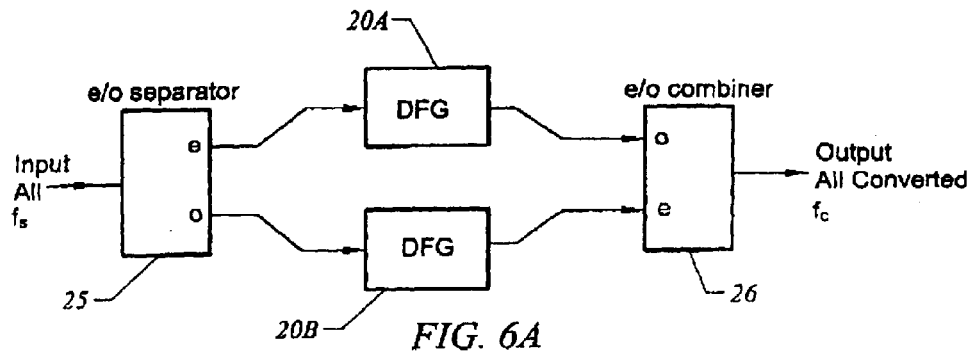
FIG. 6A is a block diagram of another embodiment of the present invention by which converted signals at all frequencies are sent to one output port.

FIG. 6A shows such an arrangement of an optical signal converter in which all the converted signals are sent to one output port. Input signals are received by a separator 25 which separates the signals by sending the input signals of even and odd frequencies to an even frequency output port, marked "e", and an odd frequency output port, marked "o", respectively. The even frequency output port is connected to the input signal port of a first DFG 20A which also receives an energizing pumping signal is at frequency $f_p1$ so that the resulting converted signals are odd frequencies. Similarly, the odd frequency output port of the separator 25 is connected to the input signal port of a second DFG 20B which also receives an energizing pumping signal is at frequency $f_p2$ so that the resulting converted signals are even frequency signals. The converted signals of both DFGs 20A and 20B are sent to the input ports of an even/odd combiner 26. The odd frequency converted signals from the DFG 20A are received by the odd input port, marked "o", of the combiner 26, and the even frequency converted signals from the DFG 20B are received by the even input port, marked "e". The even/odd combiner 26 is simply an even/odd separator as described previously with its connections reversed. Any even frequency signals from the DFG 20A at the odd input port of the combiner 26 are rejected internally and any odd frequency signals from the DFG 20B at the even input port of the combiner 26 are also rejected. The combiner 26 combines the converted signals from the DFG 20A and from the DFG 20B at a common output port.

This arrangement separates the output converted signal(s) from the input signal(s) and works whether the input signal (s) have even or odd frequencies. The embodiment works with various pump frequencies, $f_p1$ (or $\frac{1}{2}*f_p1$ with second harmonic generation in the DFG) and $f_p2$ (or $\frac{1}{2}*f_p2$ with second harmonic generation in the DFG), for the DFGs 20A and 20B as long as the pump frequencies allow the DFGs to convert the even frequency input signals to odd frequency output signals and vice versa.

Figure 6B:
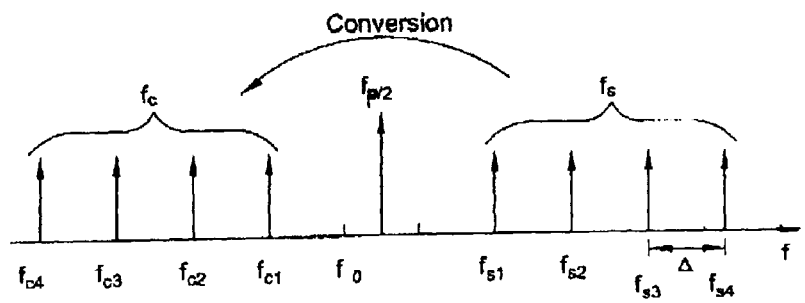
FIG. 6B illustrates the conversion of input signals at even and odd frequencies by the FIG. 6A optical signal converter.

One application of the FIG. 6A device is illustrated in FIG. 6B. Multiple input signals are converted simultaneously by one pump. The frequency grid reference frequency $f_o$ is located arbitrarily near the center of the diagram. All the input signals at frequencies $f_{s1}$–$f_{s4}$ are received by the input port of the separator 25 in FIG. 6A. Given the location of reference frequency $f_o$, $f_{s1}$ and $f_{s3}$ are even frequencies and leave the e output port of the separator 25. The DFG 20A converts these signals to odd frequencies $f_{c1}$ and $f_{c3}$. Likewise, $f_{s2}$ and $f_{s4}$ are odd frequencies and leave the o output port of the separator 25 to be converted by the DFG 20A converts to signals at even frequencies $f_{c2}$ and $f_{c4}$. The odd input port of the e/o combiner 26 receives the converted signals at frequencies $f_{c1}$ and $f_{c3}$ (and unconverted input signals at frequencies $f_{s1}$ and $f_{s3}$), but since only frequencies $f_{c1}$ and $f_{c3}$ are odd, only the converted signals at these signals are passed to the common output port of the combiner 26. Likewise, the even input port of the e/o combiner 26 receives the converted signals at frequencies $f_{c2}$ and $f_{c4}$ (and unconverted input signals at frequencies $f_{s2}$ and $f_{s4}$), but since only frequencies $f_{c2}$ and $f_{c4}$ are even, only the converted signals at these signals are passed to the common output port of the combiner 26. Thus the unconverted output signals have been separated or filtered from the input signals. A "band" of input signals at $f_s$ has been converted to a band of converted signals at $f_c$.

Figure 6C:
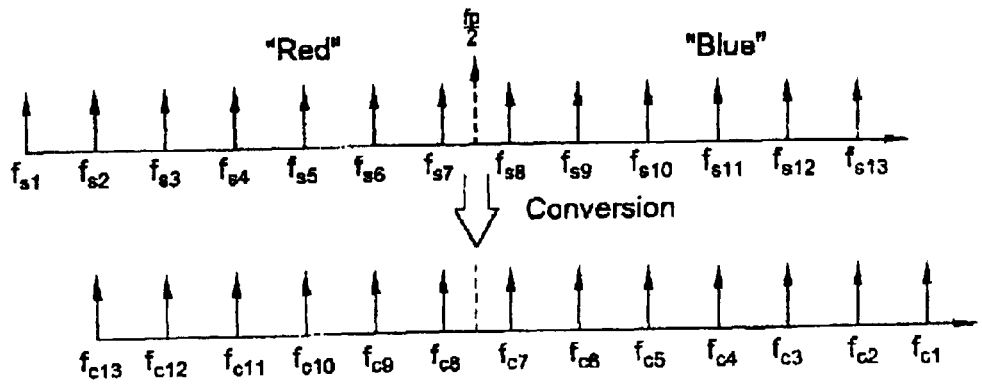
FIG. 6C illustrates the conversion of a range of input signals in which the mirroring frequency is within the range.

Another application of the FIG. 6A device is illustrated by FIG. 6C. Instead of shifting or converting signals with a small set of wavelengths to a different wavelength set, there might be a need for converting a large set of signals in a wavelength (or frequency) range about a central point which is located within the range itself Exemplary input signals in the range of frequencies, $f_{s1}-f_{s13}$, are to be converted about the central point frequency point $f_p/2$. (The central point frequency $f_p/2$ is sometimes called the "mirroring" frequency about which an input signal and its converted signal are mirrored. As discussed above, $f_p/2$ is one-half the pumping frequency for a DFG conversion process; alternatively, $f_p/2$ is the actual pump frequency for SHG:DFG and FWM conversion processes.) The input signals are shown in the top row of FIG. 6C. The signals converted from the input signals are shown in the bottom row of FIG. 6C and have frequencies, $f_{c13}-f_{c1}$, where the input signal at $f_{s1}$ is converted to the converted signal $f_{c1}$, the input signal at $f_{s2}$ to the converted signal at $f_{c2}$, and so on.

Because some of the frequencies of the converted signals are the same as the those of the input signals, for example, the input signal at $f_{s4}$ has the same frequency as the converted at $f_{c11}$, there is a problem in maintaining separation and preventing mixing of the input signals with the converted output signals. One solution to this problem is to use two conversion paths for the input signals. One way is to split the input signals about the frequency $f_p/2$ so that the signals at, say, higher frequencies than $f_p/2$ (labeled "blue" in FIG. 6C) travel down one path and are converted to signals at lower frequencies than $f_p/2$ (labeled "red" in FIG. 6C). The input signals at lower frequencies than $f_p/2$ ("red") travel down another path and are converted to signals at higher frequencies than $f_p/2$ ("blue"). This can done with an arrangement with the arrangement shown in FIG. 6A with the even/odd separator 25 and even/odd combiner 26 replaced by red/blue separators and red/blue combiners operative at the frequency $f_p/2$. The problem is the difficulty in creating a filtering device with an operating edge sharp enough to fit within one optical frequency grid spacing $\Delta$. Typically there is the undesirable "dead band" problem caused by the insufficiently sharp edges in the filtering devices, i.e., the red/blue separators and combiners in this application.

A better solution is the FIG. 6A arrangement of the present invention. Rather than a "red/blue" separation, the separator 25 performs an even/odd separation of the input signals at frequencies $f_{s1}-f_{s13}$ with the even frequency input signals going to the DFG 20A and the odd frequency input signals going to the DFG 20B. No matter what the particular conversion process, the DFGs 20A and 20B receive a pumping signal at a frequency such that the mirroring frequency is at $f_p/2$. The DFG 20A converts the even frequency input signals to the odd frequency output signals and the DFG 20B converts the odd frequency input signals to the even frequency output signals. The combiner 26 filters and combines the even and odd frequency output signals at its output port for the output frequency range, $f_{c1}-f_{c13}$.

Figure 7A:
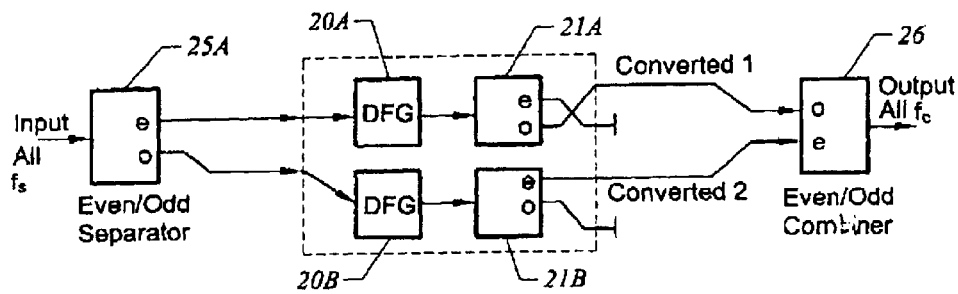
FIG. 7A is a block diagram of another embodiment of the present invention by which converted signals at all frequencies are sent to one output port.
Figure 7B:
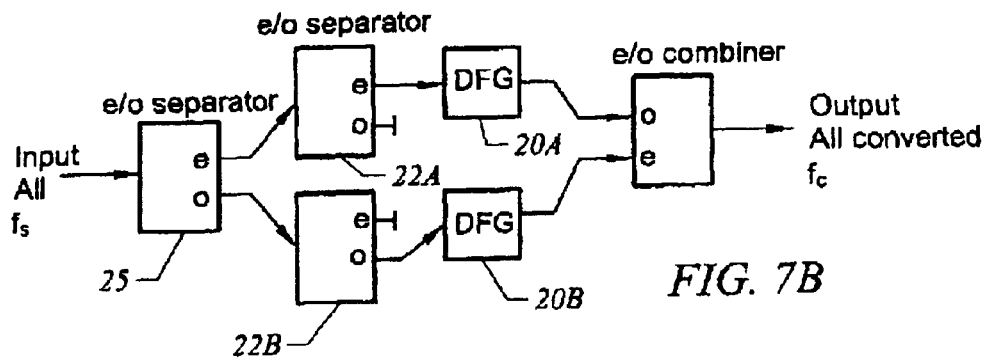
FIG. 7B is a block diagram of still another embodiment of the present invention by which converted signals at all frequencies are sent to one output port.

FIGS. 7A and 7B illustrate other arrangements which separates the output converted signal(s) from the input signal(s) and may be used in the applications described immediately above. The same reference numbers are used as in FIG. 6A to illustrate the similarity of operation of the referenced elements. The FIG. 7A arrangement has additional even/odd separators 21A and 21B respectively connected to the output of each DFG 20A and 20B. The separators 21A and 21B separates the converted signals from the input signals and the combiner 26 combines the converted signals from the DFGs 20A and 20B and sends them to the common output port. The combiner 26 also operates a filter, as described with respect to FIG. 6A, and provides for a second filtering level after DFGs 20A and 20B. In passing, the identical arrangement of the DFGs 20A and 20B and separators 21A and 21B and the arrangement of the elements of FIG. 5B are noted by the dotted line by FIG. 7A.

The FIG. 7B arrangement has additional even/odd separators 22A and 22B respectively connected between the initial separator 25 which receives all the input signals and the input of each DFG 20A and 20B. The separators 22A and 22B provide an additional filtering function on the separated input signals before they are respectively converted by the DFGs 20A and 20B. The combiner 26 combines the converted signals from the DFGs 20A and 20B and sends them to the common output port.

Another embodiment of the present invention is a particular definition or selection of the separator with respect to the pump frequency of a DFG. In some types of wavelength conversion, such as DFG, SHG:DFG and FWM processes described above, it is desirable to combine one or more input signals at particular wavelength(s) with one or more pump signals at particular wavelength(s). For example, in SHG:DFG process where the energizing pump signal is generated in the same device in which the input signal(s) is converted, the input signal(s) is combined with the actual pump signal at frequency $f_p/2$. In accordance with the present invention, this mirroring frequency is made to lie halfway between the grid locations of the signal frequencies. A suitably defined e/o separator as described above, but connected in reverse to form a combiner, can perform this function.

Returning to the calculations and above, the frequency $f_s$ of the input signal must be located on the frequency grid so that $$f_s = f_o + n_s \Delta \text{ where } n_s \text{ is an integer}$$

about an arbitrary reference frequency $f_o$ in the frequency grid of spacing $\Delta$. As stated above, the frequency of the pump frequency $f_p$ is:

$$f_p/2 = f_o + (n_p/2)*\Delta$$

wherein $n_p$ is an odd integer. Thus, as stated previously, $f_p/2$ lies halfway between the frequencies of the grid. Alternatively, a smaller grid spacing could be defined as:

$$\Delta p = \Delta/2 \text{ so that}$$

$$f_s = f_o + 2n_s \Delta_p \text{ and } f_p/2 = f_o + n_p \Delta_p$$

$$\text{or } f_s = f_o + n_s' \Delta_p \text{ where } n_s' = 2n_s$$

Figure 8A:
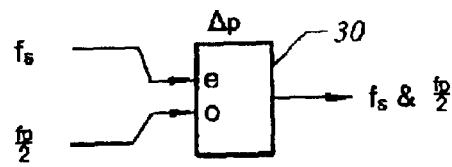
FIG. 8A is a block diagram illustrating the operation of an even/odd combiner according to the present invention.
Figure 8B:
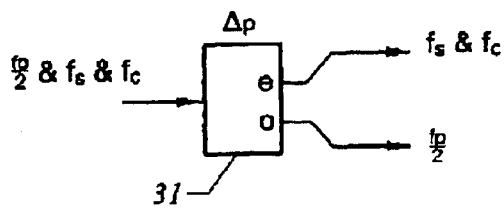
FIG. 8B is a block diagram illustrating the operation of an even/odd separator according to the present invention.

As noted above, $n_p$ is an odd integer and $n_s$ is an even integer. If a new reference frequency grid is assumed where the grid spacing is $\Delta_p$, then the frequencies of the input signals and converted signals lie at even multiples of the new grid spacing, and the frequency $f_p/2$ lies at an odd multiple of $\Delta_p$. An even/odd separator which is sensitive to the evenness/oddness of frequencies of this finer spaced grid, can be used to combine this input signal(s) and the pump signal at frequency $f_p/2$. Such a combiner 30, which is sensitive to the grid spacing $\Delta_p=\Delta/2$ with the assumption that the reference frequency $f_o$ in the frequency grid of spacing $\Delta_p$ is that same as that in the frequency grid of spacing $\Delta$, is illustrated in FIG. 8A. The output of the combined signals at the frequencies $f_s$ and $f_p/2$ can be sent to a DFG for a wavelength conversion. Likewise, if the connections are reversed, a separator 31 is created, as illustrated in FIG. 8B. The separator 31 can receive signals from a DFG or other conversion at frequencies $f_p/2$, $f_s$ and $f_c$, and separate the signal at $f_p/2$ from the signals at $f_s$ and $f_c$ due to the oddness or evenness of the multiples of the finer grid spacing $\Delta_p$.

Another application of an off-grid pump frequency is where $f_p/2$ is ¼ way (or ¾ way as well) between the grid frequencies. If we have $$f_p/2 = f_o + (n_p/2)*\Delta + \Delta/4 \text{ where } n_p \text{ is an integer,}$$

$$f_s = f_o + n_s\Delta \text{ where } n_s \text{ is an integer, and}$$

$$f_c = f_p - f_s$$

We will then have $$f_c = f_o + (n_p - n_s)*\Delta + \Delta/2$$

which will lie halfway between the grid spaced at $\Delta$. This conversion process is shown schematically in FIG. 9.

Figure 9:
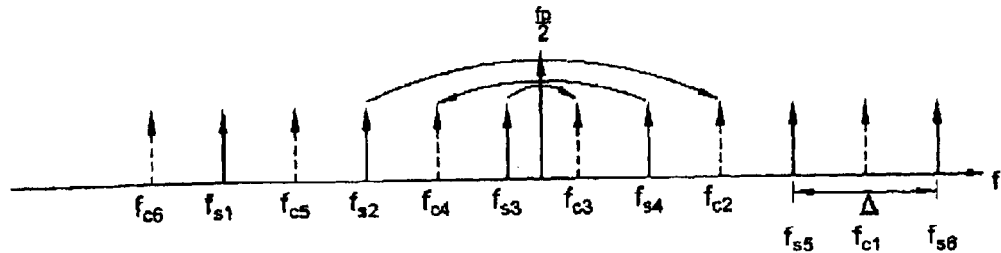
FIG. 9 illustrates the conversion of a set of frequencies when $f_p/2$ lies ¼ way between the frequency grid spacing.

In the conversion process shown in FIG. 9, the resulting converted frequency grid has the same spacing as the input signal frequency grid, but is shifted by one-half the grid spacing. This process can act as a frequency shifter of the whole set of frequencies at once.

Another advantage of the conversion process shown in FIG. 9 is the fact that, because the converted frequencies lie off the original input signal grid, there is no problem with frequencies colliding and mixing. The whole set of input frequencies can be converted in one device, even with $f_p/2$ lying within the range of the input set, without having to separate the input frequency set into two groups.

Figure 10A:
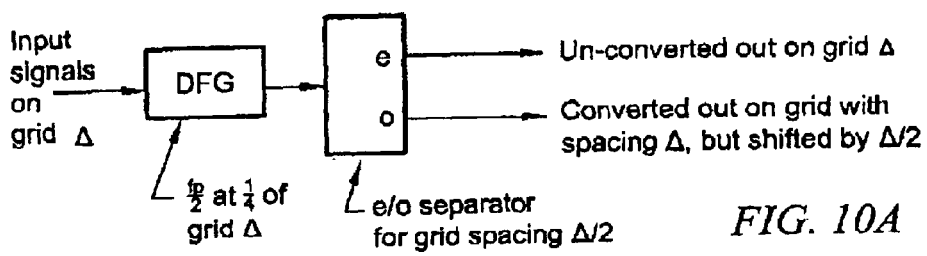
FIG. 10A shows the use of a frequency separation device to separate input signals from converted signals when $f_p/2$ lies ¼ way between the frequency grid spacing.

As shown in FIG. 10A, for the conversion process as run in the previous case, where $f_p/2$ is at ¼ or ¾ grid spacing, the output converted signals can be separated from the input signals using another e/o separator. However, this e/o separator is meant for a grid spacing of ½ the spacing of the original signals.

Figure 10B:
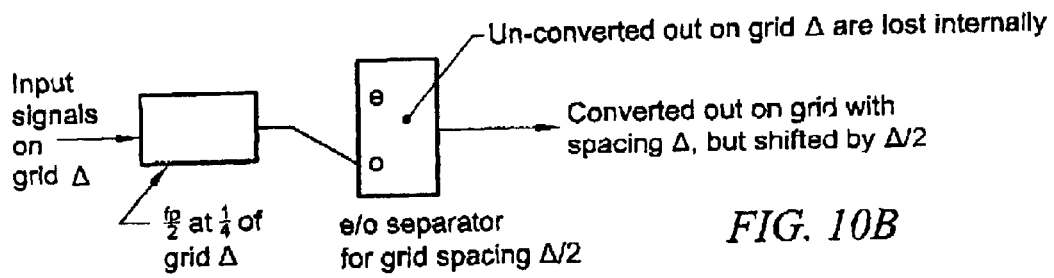
FIG. 10B shows the use of a frequency combiner device to separate input signals from converted signals when $f_p/2$ lies ¼ way between the frequency grid spacing.
Figure 11:
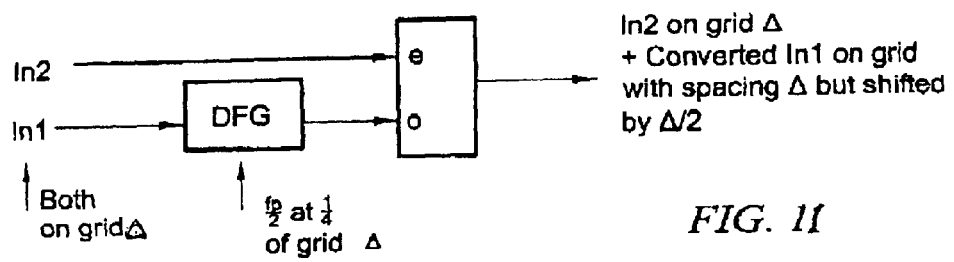
FIG. 11 shows the use of a DFG and frequency combiner device to combine a second set of input signals with a first set of input signals which has been shifted by ½ the grid spacing.

The same separation process as shown in FIG. 10A can be accomplished with the e/o separator used in reverse so that the unconverted signals may be separated or lost internally to the e/o separator. This approach is illustrated in FIG. 10B. In this fashion, the use of additional filters are may be obviated.

Further, the configuration shown in FIG. 10B can be used to combine the output converted signals with a new set of signals on the original grid spacing $\Delta$. This approach is shown in FIG. 10C and enables: signals In1 to be simultaneously converted through DFG to a shifted grid; the separation of the input In1 signals from the output converted In1 signals; and the combining of the In2 signals with the output converted In1 signals. In this fashion, the combined output of the e/o combiner may have frequencies on a grid with frequency spacing $\Delta/2$. In this fashion, all-optical frequency shifting and grid combining is accomplished by a process of DFG and interleaving. In practice, some power balancing of the two sets of signals may be required, and can be accomplished with an amplifier following the DFG or elsewhere in the system.

Therefore, while the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An optical signal converter for converting signals at one frequency to signals at another frequency within a frequency grid, each adjacent pair of frequencies in said frequency grid separated by a predetermined amount, said optical signal converter comprising a difference frequency generator receiving an energizing pump signal and an input signal at a first frequency and generating a converted signal at a second frequency from said input signal and said pump signal, said pump signal at a frequency such that said first and second frequencies are separated by an odd multiple of said predetermined amount and one-half of said pump frequency is between two frequencies of said frequency grid; and a separator having an input port and at least one output port, said input port connected to said difference frequency generator, said separator responsive to said odd multiple passing said converted signal to said at least one output port so that said converted signal is separated from said input signal.

2. The optical signal converter of claim 1 wherein said one-half of said pump frequency is one-quarter between said two frequencies.

3. The optical signal converter of claim 1 wherein said one-half of said pump frequency is one-half between said two frequencies.

4. The optical signal converter of claim 1 wherein said separator comprises a WDM interleaver device.

5. The optical signal converter of claim 1 wherein said separator has a second output port, said separator responsive to said odd multiple passing any input signals to said second output port.

6. The optical signal converter of claim 1 wherein said separator comprises an optical interferometric device.

7. The optical signal converter of claim 6 wherein said optical interferometric device comprises a Mach-Zehnder interferometer.

8. The optical signal converter of claim 6 wherein said optical interferometric device comprises an array waveguide grating.

9. The optical signal converter of claim 6 wherein said optical interferometric device comprises a Fabry-Perot interferometer.

10. The optical signal converter of claim 6 wherein said optical interferometric device comprises a crystal-based Fourier filter device.

11. The optical signal converter of claim 1 wherein said difference frequency generator receives a plurality of input signals at a plurality of first frequencies and generating a plurality of converted signals at a plurality of second frequencies from said input signals and said pump signal, said pump signal at a frequency such that said pluralities of first and second frequencies are separated by an odd multiple of said predetermined amount; and wherein said separator responsive to said odd multiple passes said plurality of converted signals to a first output port and passes any input signals to a second output port so that said converted signals are separated from said input signals.

12. The optical signal converter of claim 1 wherein said difference frequency generator receives a plurality of energizing pump signals and generating a plurality of converted signals at a plurality of second frequencies from said input signal, said pump signals at frequencies such that said first and second frequencies are separated by odd multiples of said predetermined amount; and wherein said separator responsive to said odd multiples passes said plurality of converted signals to a first output port and passes any input signals to a second output port so that said converted signals are separated from said input signals.

13. An optical signal converter for converting a plurality of input signals at a plurality of first frequencies to a plurality of signals at a plurality of second frequencies, said first and second frequencies within a frequency grid, each adjacent pair of frequencies in said frequency grid separated by a predetermined amount, said optical signal converter comprising a separator having an input port and a plurality of output ports, said separator receiving said input signals at said input port and passing said input signals to said output ports according to locations of said first frequencies of said input signals in said frequency grid;

a plurality of difference frequency generators, each difference frequency generator connected to an output port of said separator and receiving an energizing pump signal and at least one input signal at one of said first frequencies and generating a converted signal at one of said second frequencies from said input signal and said pump signal, said pump signal at a frequency such that said one of said first frequencies and said one of said second frequencies are separated by an odd multiple of said predetermined amount; and a combiner having a plurality of input ports and an output port, each input port connected to one of said difference frequency generators, said combiner responsive to said odd multiple to pass said converted signal from each difference frequency generator to said output port and to reject any input signals so that said converted signal is separated from said input signal from each difference frequency generator at said output port.

14. The optical signal converter of claim 13 wherein said input signals are at said input port of said separator simultaneously.

15. The optical signal converter of claim 13 wherein said input signals are at said input port of said separator sequentially.

16. The optical signal converter of claim 13 wherein first frequencies of said input signals are located by multiples of said predetermined amount from an arbitrary reference frequency in said frequency grid and said separator passes said input signals to said output ports according to the evenness or oddness of said multiples.

17. The optical signal converter of claim 16 wherein each difference frequency generator converts said at least one input signal to a signal at one of said second frequencies of opposite evenness or oddness of said multiple of said one of said first frequencies of said at least one input signal.

18. The optical signal converter of claim 17 wherein said combiner comprises a device the same as said separator except having a reverse connection.

19. An optical signal converter for converting a plurality of input signals at a plurality of first frequencies to a plurality of signals at a plurality of second frequencies, said first and second frequencies within a frequency grid, each adjacent pair of frequencies in said frequency grid separated by a predetermined amount, said optical signal converter comprising a first separator having an input port and a plurality of output ports, said first separator receiving said input signals at said input port and passing said input signals to said output ports according to locations of said first frequencies of said input signals in said frequency grid;

a plurality of difference frequency generators, each difference frequency generator connected to an output port of said first separator and receiving an energizing pump signal and at least one input signal at one of said first frequencies and generating a converted signal at one of said second frequencies from said input signal and said pump signal, said pump signal at a frequency such that said one of said first frequencies and said one of said second frequencies are separated by an odd multiple of said predetermined amount;

a plurality of second separators, each second separator having an input port and at least one output port, said input port connected to one of said difference frequency generators, each second separator responsive to said odd multiple to pass said converted signal to said at least one output port so that said converted signal is separated from said input signal at said output port; and a combiner having a plurality of input ports and an output port, each input port connected to one of said at least one output ports of said plurality of second separators, said combiner passing said converted signals at said plurality of input ports to said output port.

20. The optical signal converter of claim 19 wherein said input signals are at said input port of said first separator simultaneously.

21. The optical signal converter of claim 19 wherein said input signals are at said input port of said first separator sequentially.

22. The optical signal converter of claim 19 wherein first frequencies of said input signals are located by multiples of said predetermined amount from an arbitrary reference frequency in said frequency grid and said first separator passes said input signals to said output ports according to the evenness or oddness of said multiples.

23. The optical signal converter of claim 22 wherein each difference frequency generator converts said at least one input signal to a signal at one of said second frequencies of opposite evenness or oddness of said multiple of said one of said first frequencies of said at least one input signal.

24. The optical signal converter of claim 19 wherein said combiner comprises a device the same as said first separator except having a reverse connection.

25. An optical signal converter for converting signals at one frequency to signals at another frequency within a frequency grid, each adjacent pair of frequencies in said frequency grid separated by a predetermined amount, said optical signal converter comprising a difference frequency generator receiving an energizing pump signal at a pump frequency and an input signal at a first frequency and generating a converted signal at a second frequency from said input signal and said pump signal, wherein one-half of said pump frequency is between two frequencies of said frequency grid.

26. The optical signal converter of claim 25 wherein said one-half of said pump frequency is one-quarter between said two frequencies of said frequency grid.

27. The optical signal converter of claim 25 including a separator, said separator having at least one input port and at least one output port, said input port connected to said difference frequency generator.

28. The optical signal converter of claim 27 wherein said separator is responsive to an odd multiple of one half of said predetermined amount of said frequency grid so that said converted signal is separated from said input signal.

29. The optical signal converter of claim 27 wherein said separator comprises a WDM interleaver device.

30. The optical signal converter of claim 27 wherein said separator comprises an optical interferometric device.

31. The optical signal converter of claim 30 wherein said optical interferometric device comprises a Mach-Zehnder interferometer.

32. The optical signal converter of claim 30 wherein said optical interferometric device comprises an array waveguide grating.

33. The optical signal converter of claim 30 wherein said optical interferometric device comprises a Fabry-Perot interferometer.

34. The optical signal converter of claim 30 wherein said optical interferometric device comprises a crystal-based Fourier filter device.

35. The optical signal converter of claim 25 wherein said converted signal is shifted from said frequency grid by one half of said predetermined amount.

36. The optical signal converter of claim 25 including a combiner having at least one input port and at least one output port, said input port connected to said difference frequency generator, said combiner passing said converted signal at said input port to said output port.

37. The optical signal converter of claim 36 wherein said combiner is responsive to an odd multiple of one half of said predetermined amount of said frequency grid so that said converted signal is separated from said input signal.

38. The optical signal converter of claim 36 wherein said combiner comprises a WDM interleaver device.

39. The optical signal converter of claim 36 wherein said combiner comprises an optical interferometric device.

40. The optical signal converter of claim 39 wherein said optical interferometric device comprises a Mach-Zehnder interferometer.

41. The optical signal converter of claim 39 wherein said optical interferometric device comprises an array waveguide grating.

42. The optical signal converter of claim 39 wherein said optical interferometric device comprises a Fabry-Perot interferometer.

43. The optical signal converter of claim 39 wherein said optical interferometric device comprises a crystal-based Fourier filter device.

44. An optical signal converter and combiner for converting signals at a first set of frequencies located on a first frequency grid to signals at a second set of frequencies located on a second frequency grid, each adjacent pair of frequencies in said first frequency grid and said second frequency grid separated by a predetermined amount, and said second frequency grid shifted from said first frequency grid by one half of said predetermined amount, said optical signal converter and combiner comprising a difference frequency generator receiving an energizing pump signal at a pump frequency and a first input signal at said first set of frequencies and generating a converted signal at said second set of frequencies from said first input signal and said pump signal, wherein one-half of said pump frequency is one-quarter between two frequencies of said first frequency grid; and a combiner having a plurality of input ports and at least one output port, wherein a first input port is connected to said difference frequency generator, said combiner passing said second set of frequencies at said first input port to said output port.

45. The optical signal converter and combiner of claim 44 including a third signal at a third set of frequencies on said first frequency grid;

wherein said third set of frequencies are connected to a second input port of said combiner; wherein said third set of frequencies is combined with said second set of frequencies at said output port of said combiner.

* * * * *